(12) United States Patent
Wei et al.

(10) Patent No.: US 11,713,852 B1
(45) Date of Patent: Aug. 1, 2023

(54) PHOTOSENSITIVE STRUCTURE AND MOBILE LIGHTING DEVICE

(71) Applicant: Shenzhen Olight E-Commerce Technology Co., Ltd., Shenzhen (CN)

(72) Inventors: Si Wei, Shenzhen (CN); Manchun Cai, Shenzhen (CN); Ziyang Zhou, Shenzhen (CN)

(73) Assignee: Shenzhen Olight E-Commerce Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/063,608

(22) Filed: Dec. 8, 2022

(30) Foreign Application Priority Data

Oct. 17, 2022 (CN) .......................... 202211266401.2

(51) Int. Cl.
| | |
|---|---|
| *F21L 4/00* | (2006.01) |
| *H05B 47/11* | (2020.01) |
| *F21K 9/69* | (2016.01) |
| *F21V 1/04* | (2006.01) |
| *F21V 5/00* | (2018.01) |
| *F21Y 115/10* | (2016.01) |

(52) U.S. Cl.
CPC ................ *F21L 4/005* (2013.01); *F21K 9/69* (2016.08); *F21V 1/04* (2013.01); *F21V 5/006* (2013.01); *H05B 47/11* (2020.01); *F21Y 2115/10* (2016.08)

(58) Field of Classification Search
CPC ...................................................... F21L 4/005
See application file for complete search history.

(56) References Cited

U.S. PATENT DOCUMENTS

| | | | |
|---|---|---|---|
| 9,474,128 B2 * | 10/2016 | Hoang | F21V 23/005 |
| 2017/0299166 A1 * | 10/2017 | Pazdur | H05B 47/11 |
| 2019/0098731 A1 * | 3/2019 | Man | F21L 4/005 |
| 2021/0059030 A1 * | 2/2021 | Kwon | H05B 45/325 |

* cited by examiner

*Primary Examiner* — Eric T Eide
(74) *Attorney, Agent, or Firm* — Christensen O'Connor Johnson Kindness PLLC (57) ABSTRACT

The present disclosure relates to a photosensitive structure and a mobile lighting device. The photosensitive structure includes a head housing, and a metal substrate, a lens, a shading bowl, and a light sensor that are located in the head housing. The metal substrate, the lens, and the light sensor are all fixed in the head housing, and the metal substrate is located between the lens and the light sensor, the metal substrate is electrically connected to the light sensor. The shading bowl is fixed to the metal substrate and located between the metal substrate and the lens. Along a light incoming direction, the photosensitive structure is provided with a light inlet located outside a projection of the shading bowl on the metal substrate, the light sensor is configured to sense an external brightness through the light inlet.

10 Claims, 11 Drawing Sheets

PHOTOSENSITIVE STRUCTURE AND MOBILE LIGHTING DEVICE

CROSS-REFERENCE TO RELATED APPLICATIONS

This application claims priority of Chinese Patent Application No. 202211266401.2, filed on Oct. 17, 2022, entitled "PHOTOSENSITIVE STRUCTURE AND MOBILE LIGHTING DEVICE", the content of which is hereby incorporated by reference in its entirety.

TECHNICAL FIELD

The present disclosure relates to a technical field of mobile lighting, in particular to a photosensitive structure and a mobile lighting device.

BACKGROUND

With the development of mobile lighting technology, a mobile lighting device with light sensing function has emerged. This mobile lighting device can detect a light intensity of the surrounding environment and automatically adjust a lighting effect of the mobile lighting device based on this, so as to avoid burning the surrounding objects due to prolonged close exposure to strong light.

However, the conventional mobile lighting device with light sensing function completes a photosensitive by opening a hole in a lens and using an optical fiber in the hole to guide the returned light from the surroundings to a light sensor. However, opening holes in the lens affects a light output effect of the mobile lighting device to a certain extent, and the light effect is poor.

SUMMARY

Accordingly, a photosensitive structure and a mobile lighting device are provided.

A photosensitive structure includes a head housing, and a metal substrate, a lens, a shading bowl, and a light sensor that are located in the head housing, the metal substrate is located between the lens and the light sensor, the metal substrate is electrically connected to the light sensor, the shading bowl is fixed to the metal substrate and located between the metal substrate and the lens, along a light incoming direction, the photosensitive structure is provided with a light inlet located outside a projection of the shading bowl on the metal substrate, the light sensor is configured to sense an external brightness through the light inlet.

In one of the embodiments, the light sensor is located below the metal substrate, and the light inlet is provided on the metal substrate.

In one of the embodiments, a projection of the lens on the metal substrate shields the light inlet along the light incoming direction.

In one of the embodiments, the light inlet is provided on the head housing.

In one of the embodiments, a projection of the lens on the metal substrate along the light incoming direction shields the light inlet outside the metal substrate.

In one of the embodiments, along the light incoming direction, the light inlet is exposed to an external environment through the head housing.

In one of the embodiments, the photosensitive structure further includes an elastic conductive element provided between the metal substrate and the light sensor, the elastic conductive element is configured to provide an elastic support when the light sensor is forced to move towards the metal substrate, and the metal substrate is electrically connected to the light sensor through the elastic conductive element.

In one of the embodiments, the photosensitive structure further includes a light emitting element, the light emitting element is fixed to the metal substrate and is located between the metal substrate and the lens, the shading bowl surrounds the light emitting element.

A mobile lighting device includes a power supply structure and the above-mentioned photosensitive structure, the power supply structure is detachably connected to the head housing, the photosensitive structure further includes a light emitting element electrically connected to the power supply structure, the light emitting element is fixed to the metal substrate and is located between the metal substrate and the lens, and the shading bowl surrounds the light emitting element.

In one of the embodiments, the mobile lighting device further includes a hanging element provided on the power supply structure or the head housing.

Details of one or more embodiments of the present disclosure will be given in the following description and attached drawings. Other features, objects and advantages of the present disclosure will become apparent from the description, drawings, and claims.

BRIEF DESCRIPTION OF THE DRAWINGS

The drawings that form a part of the present disclosure are used to provide further understanding of the present disclosure, and exemplary embodiments and descriptions of the present disclosure are used to explain the present disclosure and not intended to limit the present disclosure.

DETAILED DESCRIPTION OF THE EMBODIMENTS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

It should be noted that when an element is referred to as being "fixed to" or "disposed on" another element, it can be directly on the other element or an intervening element may also be present. When an element is referred to as being "connected" to another element, it can be directly connected to the other element or intervening elements may also be present. The terms "vertical", "horizontal", "upper", "lower". "left", "right" and similar expressions used herein are for the purpose of illustration only and do not represent the only embodiment.

In addition, the terms "first" and "second" are only used for descriptive purposes and cannot be understood as indicating or implying relative importance or implicitly indicating the number of indicated technical features. Thus, the features defined with "first" and "second" may explicitly or implicitly include at least one of the features. In the description of the present disclosure, "multiple" means at least two, such as two, three, etc., unless otherwise expressly and specifically defined.

In the present invention, unless otherwise expressly specified and limited, the first feature "above" or "below" the second feature may be in direct contact with the first and second features, or the first and second features may be in indirect contact through an intermediate medium. Moreover, the first feature is "above" the second feature, but the first feature is directly above or diagonally above the second feature, or it only means that the horizontal height of the first feature is higher than the second feature. The first feature is "below" of the second feature, which can mean that the first feature is directly below or obliquely below the second feature, or simply that the horizontal height of the first feature is less than that of the second feature.

Unless otherwise defined, all technical and scientific terms used herein have the same meaning as commonly understood by one of ordinary skill in the art to which this application belongs. The terms used herein in the description of the present disclosure are for the purpose of describing specific embodiments only, and are not intended to limit the present disclosure. As used herein, the term "and/or" includes any and all combinations of one or more of the associated listed items.

The present disclosure discloses a photosensitive structure and a mobile lighting device, which includes part or all of the structures of the following embodiments. That is, the photosensitive structure and the mobile lighting device include some or all of the following technical features. In an embodiment of the present disclosure, the photosensitive structure includes a head housing and a metal substrate, a lens, a shading bowl, and a light sensor that are located in the head housing. The metal substrate, the lens and the light sensor are fixed in the head housing, and the metal substrate is located between the lens and the light sensor, the metal substrate is electrically connected to the light sensor. The shading bowl is fixed to the metal substrate and is located between the metal substrate and the lens. Along a light entering direction, the photosensitive structure is provided with a light inlet located outside a projection of the shading bowl on the metal substrate, the light sensor senses external brightness through the light-incoming. In the above-mentioned photosensitive structure, the light sensor is hidden under the metal substrate, and does not block an outgoing light. On the one hand, the shading bowl can resist the outgoing light and prevent the outgoing light from escaping and entering the light inlet. On the other hand, an incident light can enter the light inlet through a gap on an outside of the shading bowl, and be received and detected by the light sensor. On the other hand, since the photosensitive structure has no other obstacles to block the outgoing light, it has the advantages of large luminous flux and high light output rate when cooperated with the illumination of the light emitting element, and can emit a complete light spot, and the lighting effect is better.

Figure 1:
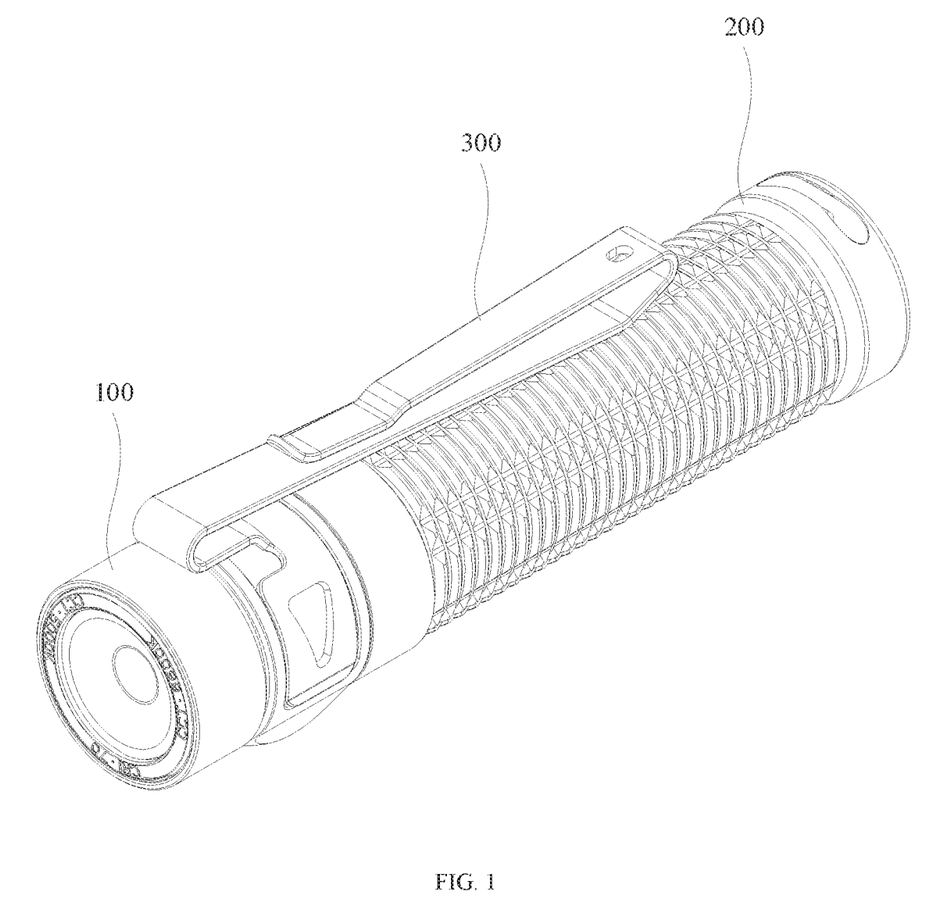
FIG. 1 is a perspective view of a mobile lighting device according to an embodiment of the present disclosure.

In one of the embodiments, the mobile lighting device is shown in FIG. 1, which includes a power supply structure 200 and a photosensitive structure 100. The power supply structure 200 is detachably connected to the photosensitive structure 100.

Figure 2:
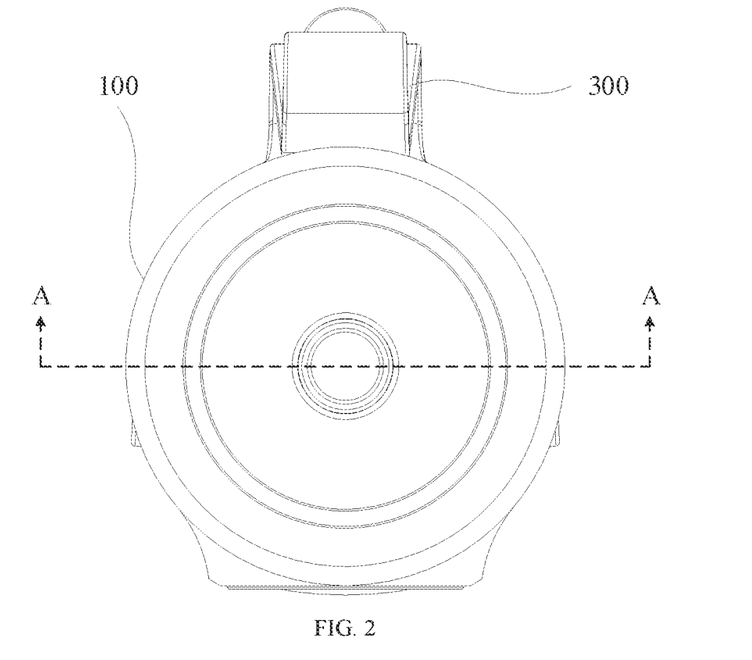
FIG. 2 is a top view of the mobile lighting device shown in FIG. 1.
Figure 3:
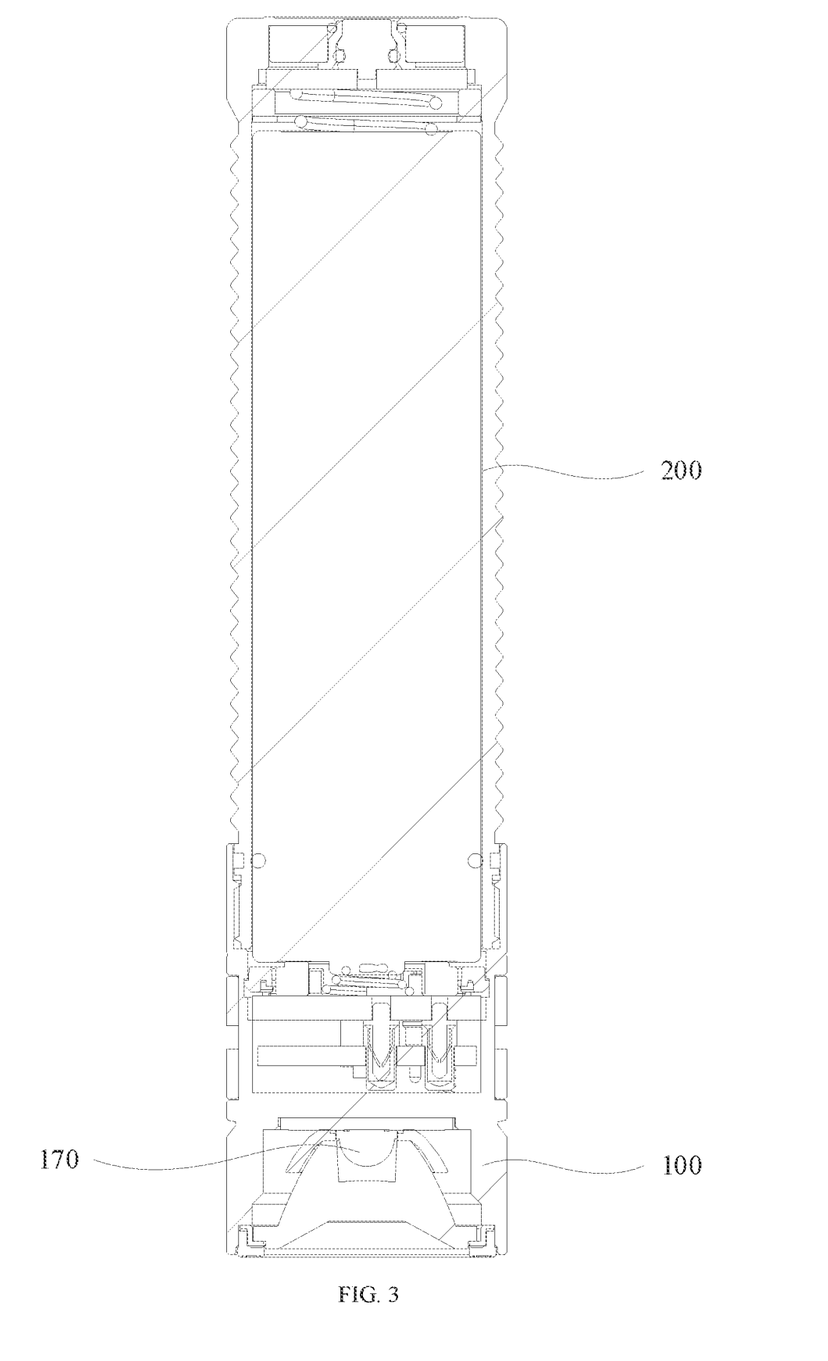
FIG. 3 is a cross-sectional view taken along the A-A line shown in FIG. 2.

Referring to FIG. 2 and FIG. 3, the mobile lighting device further includes a light emitting element 170. When connected to the photosensitive structure 100, the power supply structure 200 is electrically connected to the light emitting element 170. In this case, the light emitting element 170 can be controlled to be on or off through a control circuit or a control switch. Optionally, the light sensor 150 can also be used as the control circuit or the control switch to control on/off of the light emitting element 170.

Figure 4:
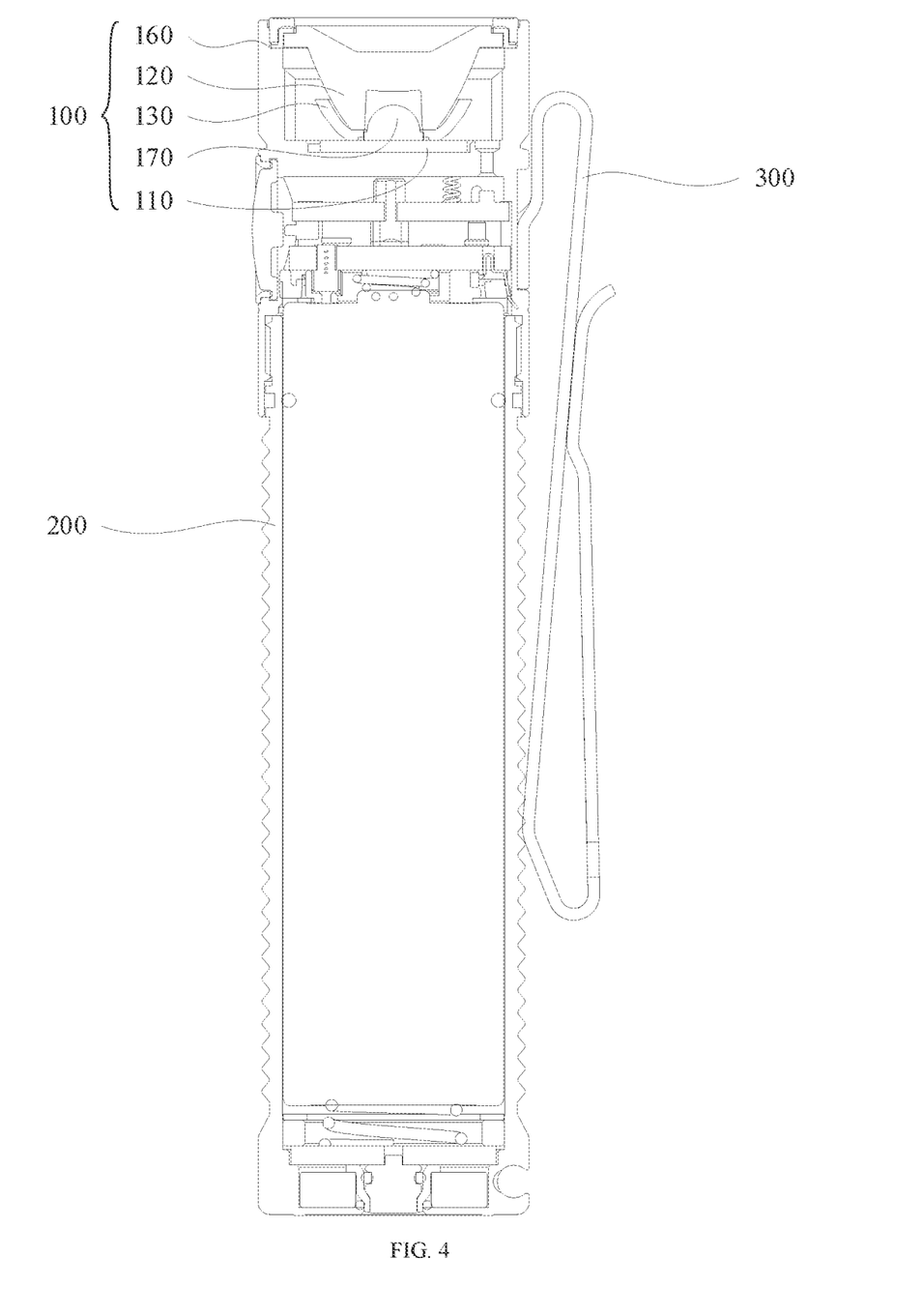
FIG. 4 is a cross-sectional view of the mobile lighting device shown in FIG. 1.

Referring to FIG. 4, the photosensitive structure 100 includes the head housing 160 and a metal substrate 110, a lens 120, a shading bowl 130, and a light sensor 150 (see FIG. 7), all of which are located in the head housing 160. The power supply structure 200 is detachably connected to the head housing 160. The light emitting element 170 is fixed to the metal substrate 110 and is located between the metal substrate 110 and the lens 120. The shading bowl 130 surrounds the light emitting element 170. When connected to the head housing 160, the power supply structure 200 is electrically connected to the light emitting element 170.

Figure 5:
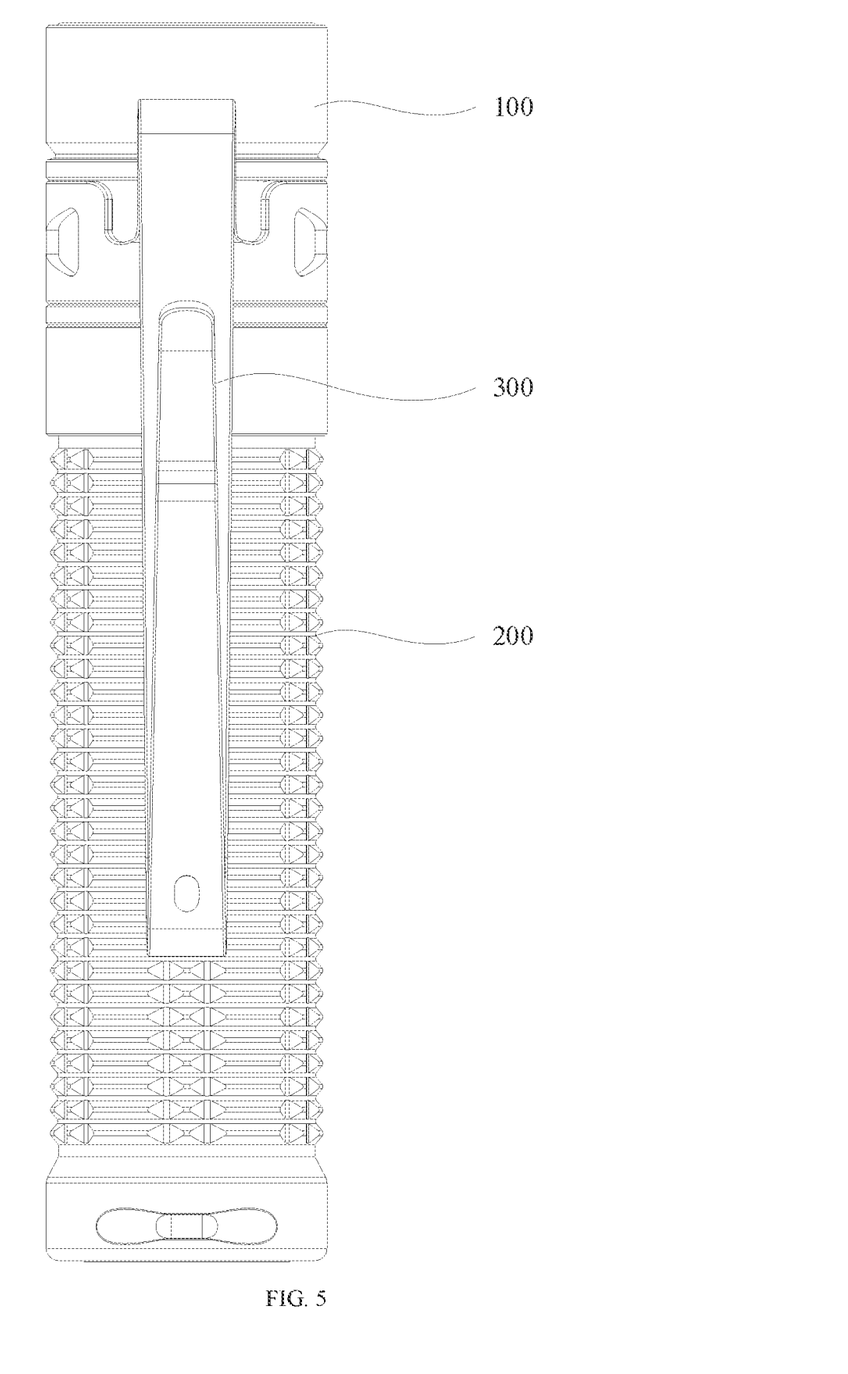
FIG. 5 is a front view of the mobile lighting device shown in FIG. 1.
Figure 6:
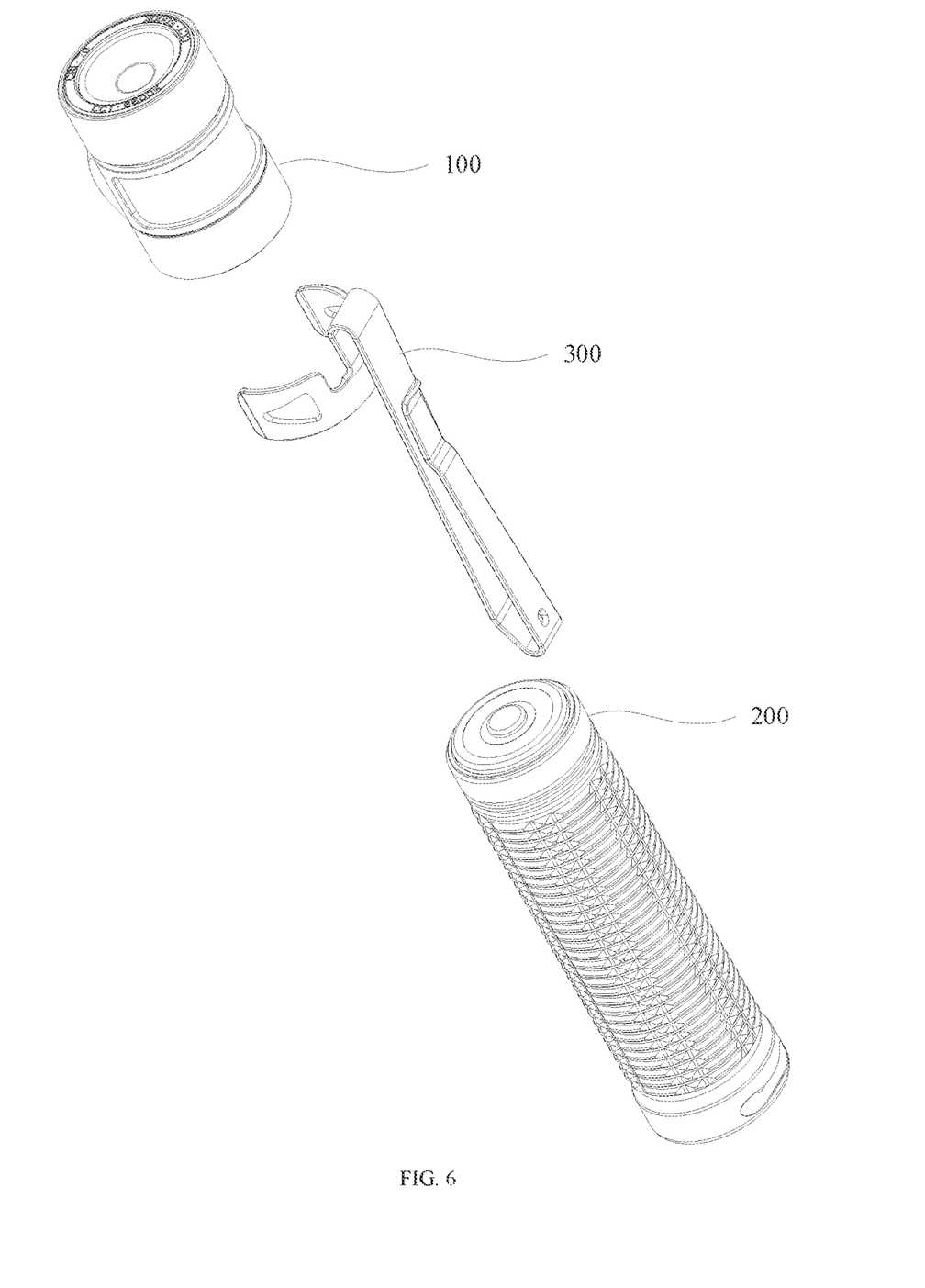
FIG. 6 is an exploded view of the mobile lighting device shown in FIG. 1.

In one of the embodiments, as shown in FIG. 5 and FIG. 6, the mobile lighting device further includes a hanging element 300. The hanging element 30) is fixed to the photosensitive structure 100, specifically, fixed to a head housing 160 (see FIG. 4) of the photosensitive structure 100. Alternatively, the hanging element 300 can be fixed to the photosensitive structure 100 and the power supply structure 200 at the same time. In one embodiment, the mobile lighting device may be a mobile lighting lamp, a mobile lighting vehicle, a vehicle searchlight, a remote-control vehicle lamp, a flashlight, a searchlight, and a mobile terminal.

With this configuration, the light sensor 150 is hidden by the metal substrate 110, and does not block an outgoing light. On the one hand, the shading bowl 130 can shield the outgoing light and prevent the outgoing light from escaping and entering the light inlet 140. On the other hand, an incident light can enter the light inlet 140 through a gap on an outside of the shading bowl 130, and be received and detected by the light sensor 150. In addition, since the photosensitive structure has no other obstacles to block the outgoing light, it has the advantages of large luminous flux and high light output rate when cooperated with the illumination of the light emitting element 170, and can emit a complete light spot, and the lighting effect is better.

The photosensitive structure 100 will be described in greater details below.

Figure 7:
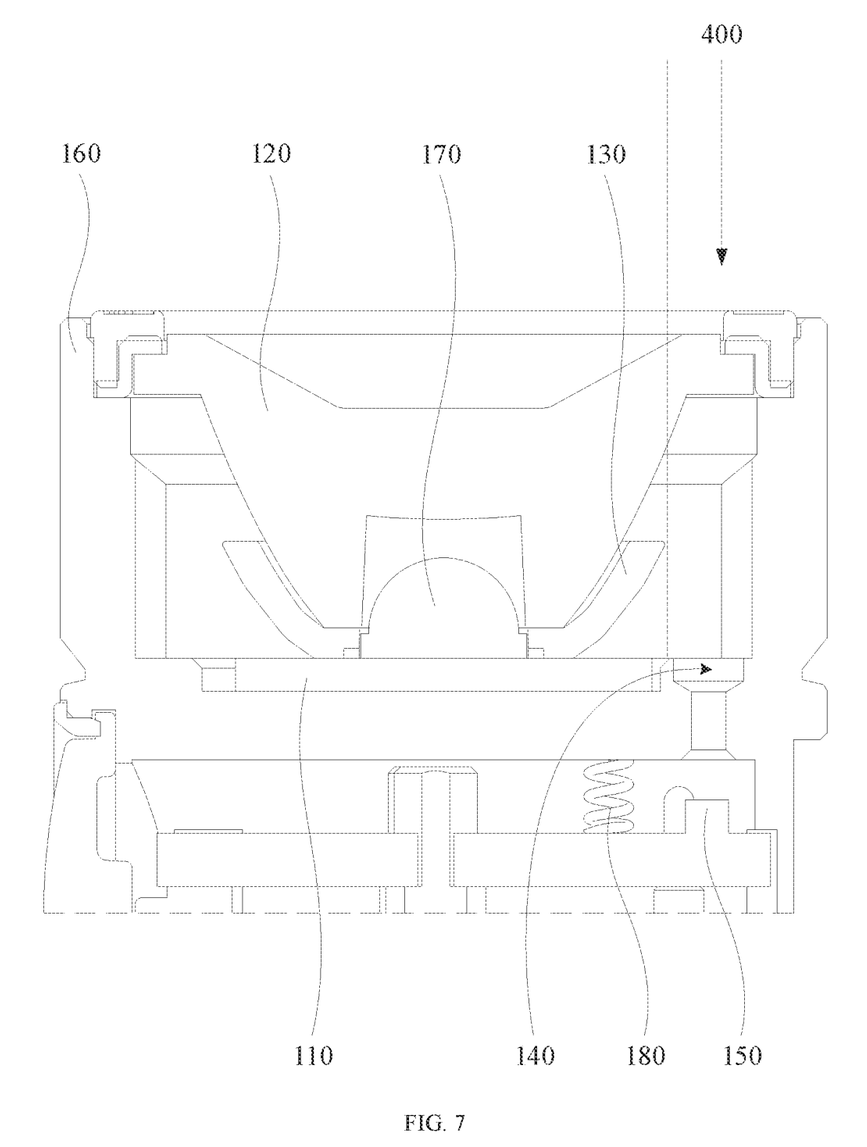
FIG. 7 is a schematic view of a photosensitive structure according to an embodiment of the present disclosure.

In one embodiment, as shown in FIG. 7, the photosensitive structure 100 includes the head housing 160, the metal substrate 110, the lens 120, the shading bowl 130, and the light sensor 150. The metal substrate 110, the lens 120, and the light sensor 150 are all fixed in the head housing 160, and the metal substrate 110 is located between the lens 120 and the light sensor 150. The metal substrate 110 is electrically connected to the light sensor 150. The shading bowl 130 is fixed to the metal substrate 110 and is located between the metal substrate 110 and the lens 120. The photosensitive structure 100 is provided with a light inlet 140, and the light sensor 150 can sense an external brightness through the light inlet 140. In this embodiment, the photosensitive structure 100 further includes the light emitting element 170, the light emitting element 170 is fixed to the metal substrate 110 and located between the metal substrate 110 and the lens 120, and the shading bowl 130 surrounds the light emitting element 170. The light emitting element 170 includes, but is not limited to, LED lamp beads, that is. LED chips.

In order to ensure a light emitting effect of the light emitting element 170, in one of the embodiments, the lens 120 and the shading bowl 130 are arranged coaxially. That is, the lens 120 and the shading bowl 130 both have a central axis, and their central axes coincide. Such configuration is beneficial to ensure an irradiating position and an irradiating range of the light emitted by the light emitting element 170, and cooperates with the light sensor 150 being located below the metal substrate 110 or the light inlet 140 being located outside the shading bowl 130, which is beneficial to emit a complete light spot, thereby having a better lighting effect.

Figure 8:
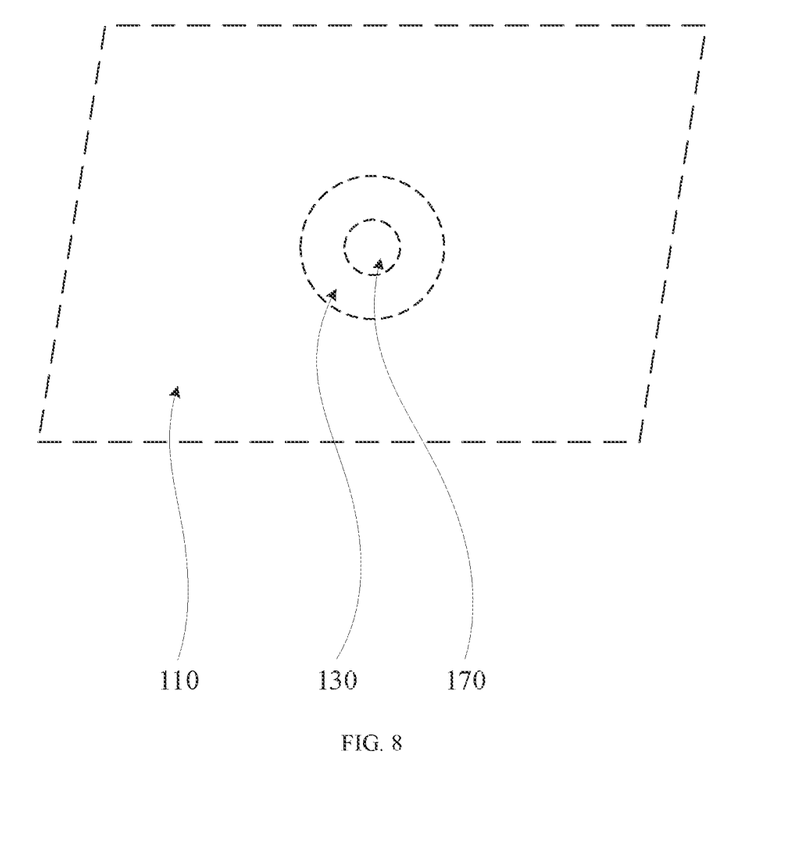
FIG. 8 is a schematic view of a projection of a light emitting element and a shading bowl along a light entering direction on a plane where a metal substrate is located.
Figure 9:
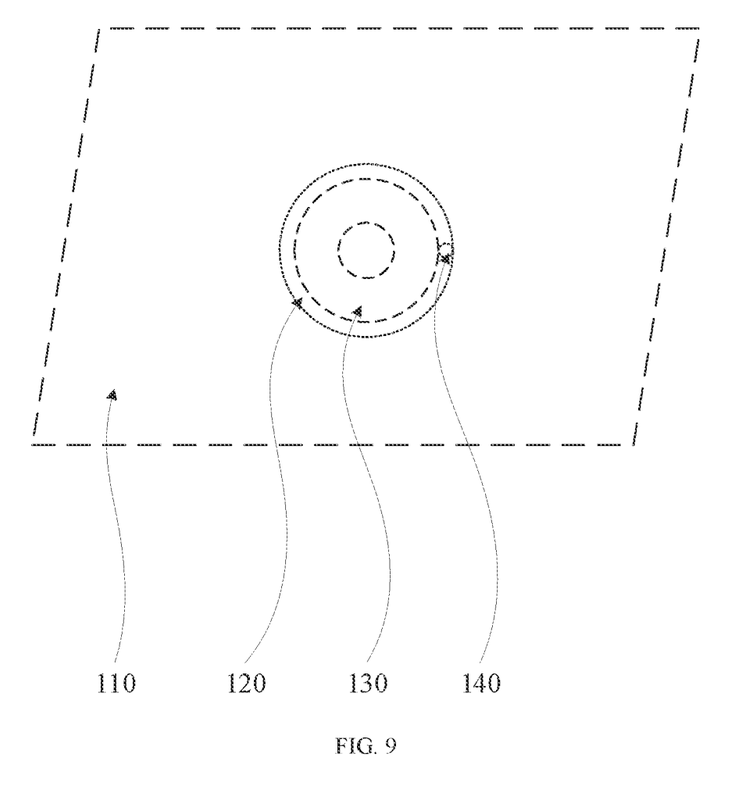
FIG. 9 is a schematic view of a projection of a light emitting element and a shading bowl, a lens and a light inlet along a light incoming direction on a plane where a metal substrate is located.

Referring to FIGS. 7, 8, and 9, the shading bowl 130 is located outside a projection of the shading bowl 130 on the metal substrate 110 along a light incoming direction 400. That is, on a plane where the metal substrate 110 is located, the shading bowl 130 has a projection range along the light incoming direction 400, and the light inlet 140 is located outside the projection range. That is, the light inlet 140 is located outside the shading bowl 130. Further, in one of the embodiments, the light emitted by the light emitting element 170 is directed to the external environment only through the lens 120. Alternatively, the light emitted by of the light emitting element 170 is directed to the external environment through the lens 120 and a transparent cover. With such configuration, since the light sensor 150 is hidden under the light inlet 140, there are no other components inside the photosensitive structure 100 to block the emitted light, the light emitted by the light emitting element 170 is free from other interference except for the lens 120 and its transparent cover. Compared with the conventional light sensing mobile lighting device, the mobile lighting device provided by this embodiment has a larger luminous flux and a higher light extraction rate. Since the light emitted by the light emitting element 170 is free from other interferences, the complete light spot can be emitted instead of an incomplete light spot, thus having a better lighting effect.

In this embodiment, as shown in FIG. 9, along the light incoming direction 400, the projection of the lens 120 on the metal substrate 110 shields the light inlet 140. The light inlet 140 can be located on the metal substrate 110 or on the head housing 160. In one embodiment, the light sensor 150 is located below the metal substrate 110, and the light inlet 140 is defined on the metal substrate 110. Further, in one of the embodiments, the lens 120 is provided with an extension portion, along the light incoming direction 400, a projection of the extension portion on the metal substrate 110 shields the light inlet 140. A projection of the rest of the lens 120 except the extension portion on the metal substrate 110 coincides with the projection of the shading bowl 130 on the metal substrate 110. Furthermore, in one of the embodiments, the extension portion is in a shape of a semicircle, a rectangle, a rectangle with rounded corners, or an ellipse. Such configuration is beneficial to control a size of an additional projected area of the lens 120 relative to the shading bowl 130, that is, to control a size of the lens 120.

In one embodiment, the light inlet 140 is provided on the head housing 160. In one embodiment, along the light incoming direction 400, the projection of the lens 120 on the metal substrate 110 shields the light inlet 140 outside the metal substrate 110. Alternatively, the light inlet 140 may not be shielded by the lens 120. In one of the embodiments, along the light incoming direction 400, the light inlet 140 is exposed to the outside through the head housing 160. In this way, external light can access the light inlet 140 through the head housing 160, so that the light sensor 150 can sense the brightness of the external light.

In order to protect the light sensor 150 from impact damage, in one of the embodiments, the photosensitive structure 100 further includes an elastic conductive element 180 located between the metal substrate 110 and the light sensor 150. The elastic conductive element 180 is configured to provide elastic support when the light sensor 150 is forced to move towards the metal substrate 110, and the metal substrate 110 is electrically connected to the light sensor 150 through the elastic conductive element 180. Further, in one of the embodiments, the light sensor 150 is mounted to a sensing circuit board (not shown), one end of the elastic conductive element 180 is electrically connected, for example welded, clipped or abutted against the sensing circuit board, and the other end of the elastic conductive element 180 is electrically connected to the metal substrate 110, so as to realize elastic conduction. When carrying or using the photosensitive structure 100, even if shaking or vibration occurs, an effective and stable connection between the sensing circuit board and the metal substrate 110 can be maintained, thereby ensuring the continuity of the circuit. Further, in one of the embodiments, the elastic conductive element 180 abuts against two sides of the light sensor 150, so that the light sensor 150 has an effect of elastic suspension installation relative to the head housing 160 or the metal substrate 110. Such configuration is beneficial to avoid damage or accidental displacement of the light sensor 150 caused by collisions when using the mobile lighting device or the photosensitive structure 100, thereby effectively ensuring a life of the mobile lighting device or the photosensitive structure 100.

Figure 10:
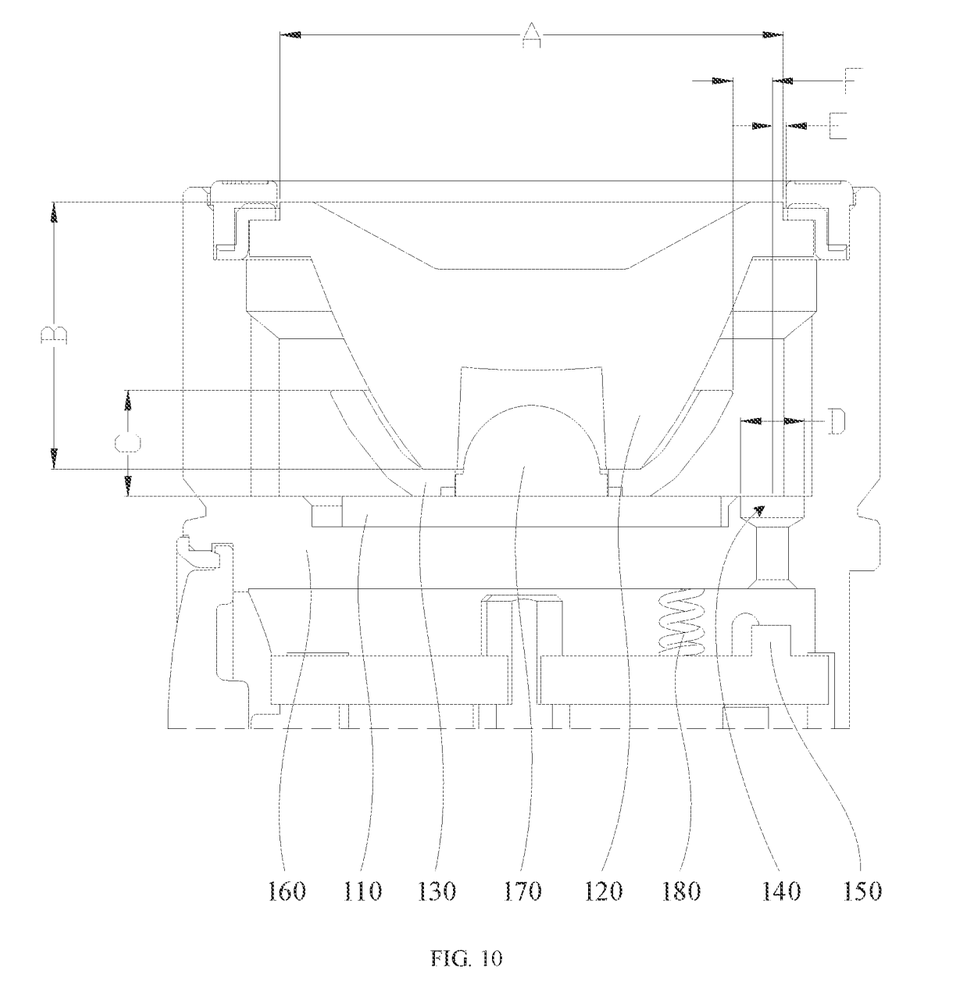
FIG. 10 is a schematic view of a photosensitive structure according to another embodiment of the present disclosure.

In one of the specific application embodiments, the light emitting elements 170 are LED lamp beads. As shown in FIG. 10, the LED lamp beads are welded on the metal substrate 110, the metal substrate 110 is mounted inside the head housing 160, the lens 120 is coaxially arranged with the shading bowl 130, and the shading bowl 130 is located outside the lens 120. The light inlet 140 is provided on an internal side of the head housing 160, the light sensor 150 is located under the light inlet 140. In this embodiment, a diameter of the lens 120 is defined as A, a height of the lens 120 is defined as B. The lens 120 is configured to adjust an optical path. A height of the shading bowl 130 is defined as C, the shading bowl 130 is configured to block the light emitting element 170, so as to prevent the emitted light from the light emitting element 170 from entering the light inlet 140, so as to avoid affecting the detection effect of the light sensor 150. A diameter of the light inlet 140 is defined as D, the light inlet 140 is configured to receive incident light. The incident light includes light entering from the external environment, or light reflected by the external environment or the head housing 160. The incident light can enter the light inlet 140 from a first gap from the axis of the light inlet 140 to an outer edge of the lens 120 and a second gap from the axis of the light inlet 140 to an outer edge of the shading bowl 130. A width of the first gap is defined as E, a width of the second gap is defined as F. The light sensor 150 is configured to detect incident light.

Further, the sizes of A, B and D are known, and a relationship between the above sizes is configured as follows:

$$35A = 88C \quad \text{Formula 1}$$

$$E + F = \frac{1}{2}\left(A - \frac{35}{88}A \times \arctan\frac{A}{B}\right) \quad \text{Formula 2}$$

$$E + F \leq D \quad \text{Formula 3}$$

$$F = \frac{1}{2}D \quad \text{Formula 4}$$

$$E = \frac{1}{2}\left(A - \frac{35}{88}A \times \arctan\frac{A}{B} - D\right) \quad \text{Formula 5}$$

The lens 120 is selected and the light inlet 140 is determined. According to the diameter A and the height B of the lens 120, and the diameter D of the light inlet 140, the height C of the shading bowl 130 is obtained as 35A/88. A width E of the first gap from the axis of the light inlet 140 to the outer edge of the lens 120 is defined as $$\left(A - \frac{35}{88}A \times \arctan\frac{A}{B} - D\right)\Big/2.$$

A width F of the second gap from the axis of the light inlet 140 to the outer edge of the shading bowl 130 is defined as D/2. That is, for the specific mobile lighting device or the photosensitive structure, the diameter A and height B of the lens 120, and the diameter D of the light inlet 140 are predetermined. At this time, the height C of the shading bowl 130 and the specific position of the light inlet 140 can be determined according to the above formula 1 to formula 5. The specific position includes the width E of the first gap from the axis of the light inlet 140 to the outer edge of the lens 120, and the width F of the second gap from the axis of the light inlet 140 to the outer edge of the shading bowl 130, thereby obtaining the mobile lighting device and its light path as shown in FIG. 10. Such a structural configuration, on the one hand, is beneficial to control the size of the mobile lighting device or the photosensitive structure, so that it can reduce the consumption of materials while satisfying the light. On the other hand, the shading bowl 130 does not completely shield the lens 120, there is the gap between the outside of the shading bowl 130 and the outside of the lens 120, so that the shading bowl 130 can resist the outgoing light and prevent the outgoing light from escaping and entering the light inlet, and the incident light can enter the light inlet 140 through the gap between the outside of the shading bowl 130 and the outside of the lens 120, and be received and detected by the light sensor 150. On the other hand, the light sensor 150 is hidden under the metal substrate 110 and does not block the outgoing light, and there are no other obstacles inside the mobile lighting device to block the outgoing light, so that it can obtain large luminous flux and high light output rate, and can emit a complete light spot, and the lighting effect is better.

Figure 11:
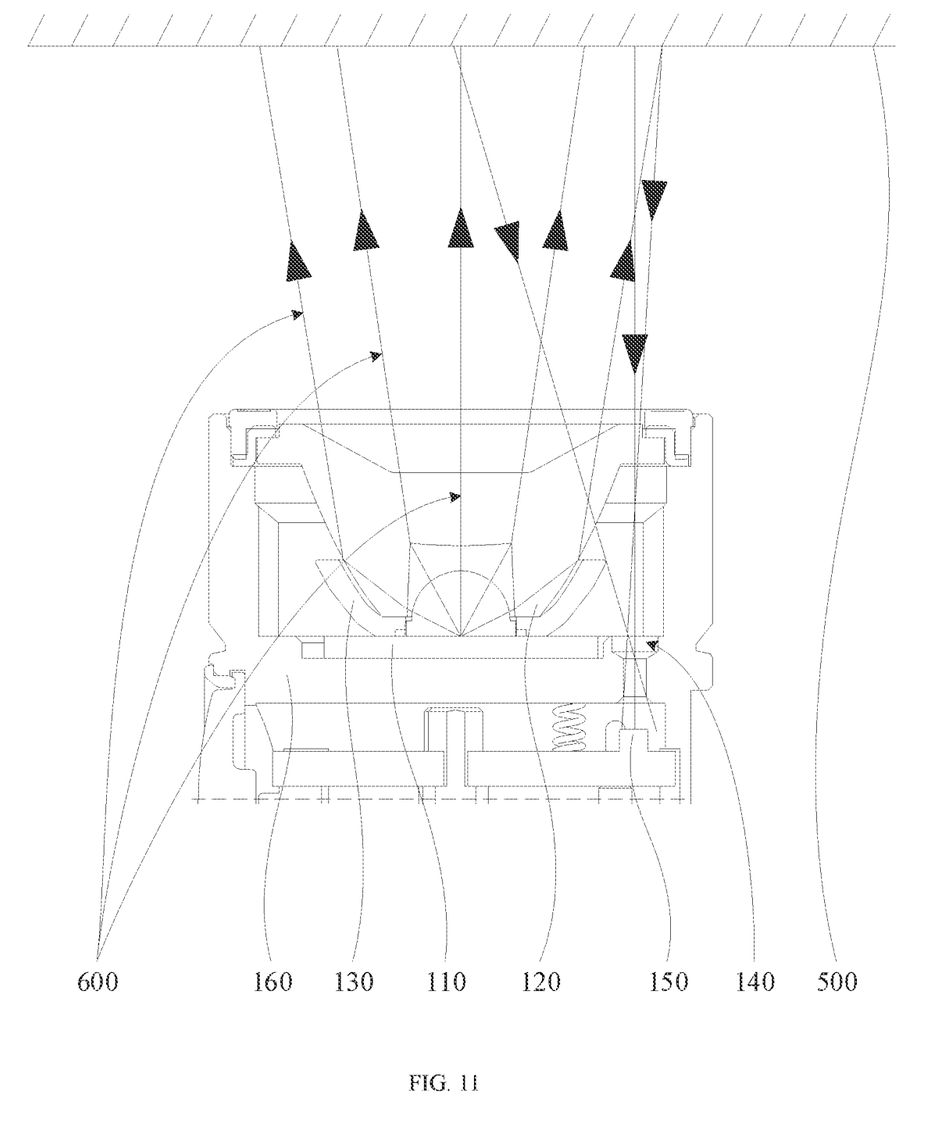
FIG. 11 is a schematic view of an optical path of the photosensitive structure shown in FIG. 10.

In actual use, as shown in FIG. 11, the lens 120 adjusts the outgoing light 60 to illuminate the surrounding environment of an irradiating surface 50X), and the light of the surrounding environment can enter the light inlet 140 through the gap between the outer edge of the lens 120 and the outer edge of the shading bowl 130, so that the light sensor 150 hidden under the light inlet 140 can receive light. The light sensor 150 detects the incident light, the mobile lighting device can automatically adjust the lighting effect according to a detection result, which has high safety. Since the light sensor 150 is hidden under the light inlet 140, there is no other obstacles inside the mobile lighting device to block the outgoing light, compared with the existing light sensing mobile lighting device, the mobile lighting device or the photosensitive structure provided by each embodiment of the present disclosure has the larger luminous flux, the higher light output rate, and can emit a complete light spot around it, and the lighting effect is better.

It should be noted that other embodiments of the present disclosure also include a photosensitive structure and a mobile lighting device formed by combining the technical features of the above-mentioned embodiments.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the present invention.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

What is claimed is:

1. A photosensitive structure, comprising:
   a head housing; and
   a metal substrate, a lens, a shading bowl, and a light sensor that are located in the head housing;
   wherein the metal substrate is located between the lens and the light sensor, the metal substrate is electrically connected to the light sensor, the shading bowl is fixed to the metal substrate and located between the metal substrate and the lens,
   wherein along a light incoming direction, the photosensitive structure is provided with a light inlet located outside a projection of the shading bowl on the metal substrate, the light sensor is configured to sense an external brightness through the light inlet.

2. The photosensitive structure according to claim 1, wherein the light sensor is located below the metal substrate, and the light inlet is provided on the metal substrate.

3. The photosensitive structure according to claim 2, wherein a projection of the lens on the metal substrate shields the light inlet along the light incoming direction.

4. The photosensitive structure according to claim 1, wherein the light inlet is provided on the head housing.

5. The photosensitive structure according to claim 4, wherein a projection of the lens on the metal substrate along the light incoming direction shields the light inlet outside the metal substrate.

6. The photosensitive structure according to claim 4, wherein along the light incoming direction, the light inlet is exposed to an external environment through the head housing.

7. The photosensitive structure according to claim 1, further comprising an elastic conductive element provided between the metal substrate and the light sensor, wherein the elastic conductive element is configured to provide an elastic support when the light sensor is forced to move towards the metal substrate, and the metal substrate is electrically connected to the light sensor through the elastic conductive element.

8. The photosensitive structure according to claim 1, further comprising a light emitting element, wherein the light emitting element is fixed to the metal substrate and is located between the metal substrate and the lens, the shading bowl surrounds the light emitting element.

9. A mobile lighting device, comprising a power supply structure and the photosensitive structure according to claim 1;
   wherein the power supply structure is detachably connected to the head housing;
   the photosensitive structure further comprises a light emitting element electrically connected to the power supply structure, the light emitting element is fixed to the metal substrate and is located between the metal substrate and the lens, and the shading bowl surrounds the light emitting element.

10. The mobile lighting device according to claim 9, further comprising a hanging element provided on the power supply structure or the head housing.

\* \* \* \* \*